US011503470B2

(12) United States Patent
Henry et al.

(10) Patent No.: US 11,503,470 B2
(45) Date of Patent: Nov. 15, 2022

(54) MANAGEMENT OF AN ADAPTIVE RELAY METHOD FOR LOST-DEVICE BLUETOOTH LOW ENERGY SIGNALING

(71) Applicant: Cisco Technology, Inc., San Jose, CA (US)

(72) Inventors: Jerome Henry, Pittsboro, NC (US);
Robert E. Barton, Richmond (CA);
Darryl E. Sladden, Danville, CA (US);
Thomas Szigeti, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 50 days.

(21) Appl. No.: 16/989,758

(22) Filed: Aug. 10, 2020

(65) Prior Publication Data

US 2022/0046736 A1 Feb. 10, 2022

(51) Int. Cl.
*H04W 4/02* (2018.01)
*H04W 4/029* (2018.01)
(Continued)

(52) U.S. Cl.
CPC .......... *H04W 12/12* (2013.01); *H04W 4/023* (2013.01); *H04W 4/029* (2018.02); *H04W 12/79* (2021.01); *H04W 24/10* (2013.01); *H04W 48/16* (2013.01); *H04W 48/20* (2013.01); *H04W 76/16* (2018.02); *H04W 88/04* (2013.01); *H04W 88/08* (2013.01);
(Continued)

(58) Field of Classification Search
CPC .......... H04B 17/0082–409; H04L 63/02–308; H04L 2209/80–805; H04W 4/02–029; H04W 12/009–80; H04W 24/02–10; H04W 48/02–20; H04W 64/003–006; H04W 76/10–50; H04W 84/005–22; H04W 88/005–188; H04W 92/02–24
See application file for complete search history.

(56) References Cited

U.S. PATENT DOCUMENTS

2005/0285737 A1\* 12/2005 Kobayashi ........... H04B 17/318
2014/0189806 A1\* 7/2014 Cho ...................... H04W 12/08
(Continued)

OTHER PUBLICATIONS

H. Tran, A. Mukherji, N. Bulusu, S. Pandey and X. Zhang, "Improving Infrastructure-based Indoor Positioning Systems with Device Motion Detection," 2019 IEEE International Conference on Pervasive Computing and Communications (PerCom, Kyoto, Japan, 2019, 10 pages.
(Continued)

*Primary Examiner* — Timothy J Weidner
(74) *Attorney, Agent, or Firm* — Patterson + Sheridan, LLP

(57) ABSTRACT

Techniques and apparatus for managing a message relaying system are described. One technique includes an access point (AP) detecting a first signal and a second signal from a computing device. A validation of the first signal is performed based on parameters of the first signal and the second signal. After the validation, information associated with the first signal is transmitted to a computing system. In another technique, the computing system may designate one of multiple APs reporting information regarding first signals as a primary reporting AP and designate the remaining APs as secondary reporting APs. The computing system may instruct the secondary reporting APs to refrain from reporting information regarding first signals to the computing system.

20 Claims, 13 Drawing Sheets

(51) Int. Cl.
*H04W 12/12* (2021.01)
*H04W 12/79* (2021.01)
*H04W 24/10* (2009.01)
*H04W 48/16* (2009.01)
*H04W 48/20* (2009.01)
*H04W 76/16* (2018.01)
*H04W 88/04* (2009.01)
*H04W 88/08* (2009.01)
*H04W 88/12* (2009.01)
*H04W 92/10* (2009.01)
*H04W 92/12* (2009.01)

(52) U.S. Cl.
CPC ............ *H04W 88/12* (2013.01); *H04W 92/10* (2013.01); *H04W 92/12* (2013.01)

(56) References Cited

U.S. PATENT DOCUMENTS

2018/0124732 A1\* 5/2018 Kamthe ................ H04W 64/00
2021/0041521 A1\* 2/2021 Canedo Rodriguez ...................... H04W 4/02

OTHER PUBLICATIONS

"Apple details how offline location works in 'Find My' app, will require you own two apple devices," 9To5Mac, Jun. 5, 2019, 8 pages.

\* cited by examiner

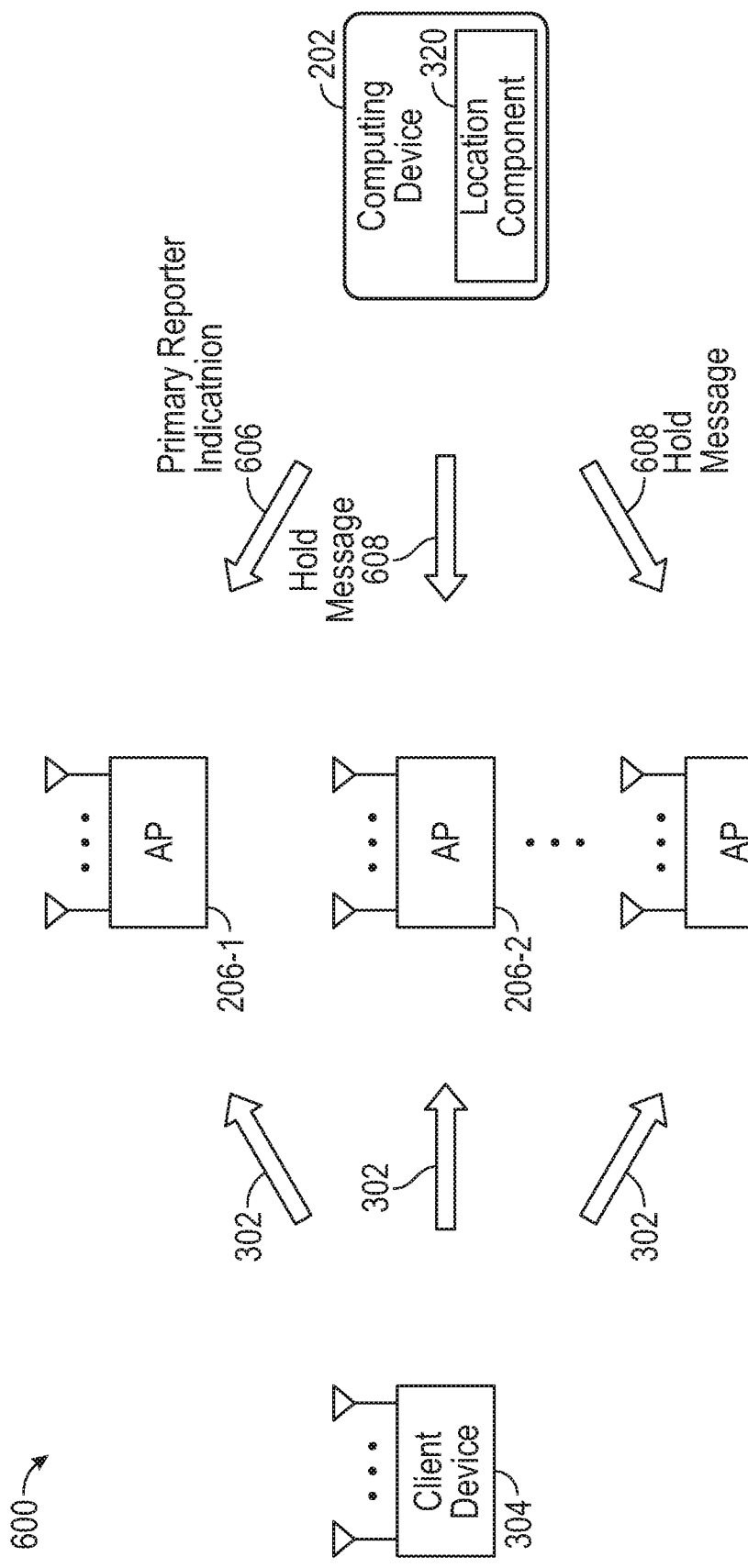

MANAGEMENT OF AN ADAPTIVE RELAY METHOD FOR LOST-DEVICE BLUETOOTH LOW ENERGY SIGNALING

TECHNICAL FIELD

Embodiments presented in this disclosure generally relate to techniques for managing a message relaying system used for determining a location of a computing device.

BACKGROUND

Some device vendors (e.g., device manufacturers) implement a messaging system between the computing devices in their ecosystem that can be used to locate lost computing devices. For example, in this messaging system, an idle or offline device can broadcast encrypted messages. Other devices within the vicinity of the idle or offline device can detect the broadcast messages and relay the messages to a cloud computing system associated with the device vendor. The cloud computing system can determine an approximate location of the idle or offline device, based on the relayed messages from the other devices. A user (e.g., owner) of the idle or offline device can access the cloud computing system to determine the location of the idle or offline device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 6A-6C illustrate a workflow for managing a message relaying system, according to one embodiment.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a computer-implemented method performed by an access point (AP). The computer-implemented method includes detecting a first signal and a second signal from a computing device within an environment. The computer-implemented method also includes performing a validation of the first signal, based at least in part on one or more parameters of the first signal and one or more parameters of the second signal. The computer-implemented method further includes after performing the validation of the first signal, transmitting information regarding the first signal to a computing system.

Another embodiment presented in this disclosure is an AP. The AP generally includes a processor and a memory containing a program that, when executed by the processor, performs an operation. The operation generally includes detecting a first signal and a second signal from a computing device within an environment. The operation also includes performing a validation of the first signal, based at least in part on one or more parameters of the first signal and one or more parameters of the second signal. The operation further includes after performing the validation of the first signal, transmitting information regarding the first signal to a computing system.

Another embodiment presented in this disclosure is a computer-implemented method performed by an apparatus. The computer-implemented method generally includes receiving a plurality of first messages from a plurality of APs. Each first message includes information regarding a device signal received by the AP from a computing device. The computer-implemented method also includes selecting, based on an evaluation of each of the plurality of first messages, one of the plurality of APs as a primary reporting AP. The computer-implemented method further includes transmitting to the first AP a second message comprising an indication that the first AP is the primary reporting AP. The computer-implemented further yet includes, after transmitting the second message, forwarding the first message to a computing system.

EXAMPLE EMBODIMENTS

The location mechanism in messaging systems generally relies on the presence of other computing devices that belong to the same ecosystem as the missing or lost device. However, in some situations, there may not be a neighboring computing device (belonging to the same ecosystem as the missing device) in the vicinity of the missing device. Moreover, in some situations, the neighboring computing device may be in the vicinity of the missing device for a short period of time (e.g., the neighboring computing device may be carried by a user that is passing by the missing device).

Figure 1:
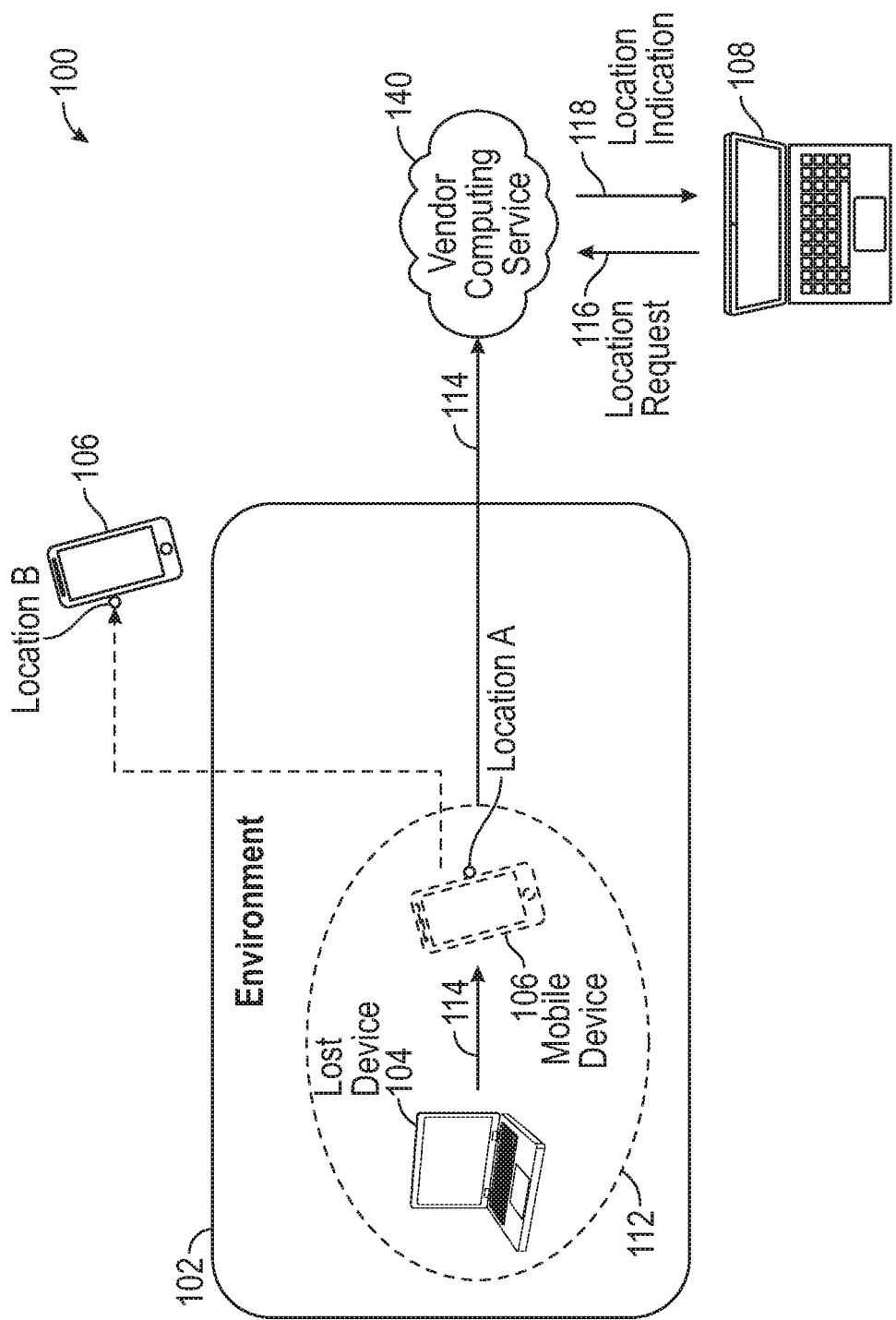
FIG. 1 illustrates an example scenario in which a neighboring device is in presence of a missing computing device.

FIG. 1, for example, depicts a reference scenario 100 in which a mobile device 106 is temporarily in the vicinity (or proximity) 112 of a lost device 104 (e.g., laptop) within an (indoor) environment 102. As shown, the lost device 104 sends (e.g., broadcasts) a device signal 114, which can be detected by one or more neighboring devices within a vicinity 112 of the lost device 104. In one particular embodiment, the device signal 114 is an encrypted Bluetooth (BT)

signal (or message). In another particular embodiment, the device signal 114 is an encrypted Bluetooth Low Energy (BLE) signal (or message). Here, the device signal 114 is detected by the mobile device 106 when the mobile device 106 is in location A. The mobile device 106, in turn, relays (or forwards) the device signal 114 to the vendor computing service 140.

The vendor computing service 140 may be a cloud computing service used for computing devices that belong to the same ecosystem (e.g., computing devices from the same manufacturer, company, etc.). The vendor computing service 140 can allow a user to access the service to request the location of a device that may have been lost by the user. Here, for example, a user submits (via the computing device 108) a location request 116 for the lost device 104 to the vendor computing service 140. In response, the vendor computing service 140 returns a location indication 118 indicating the location of the mobile device 106 at the time that the mobile device 106 detected (and/or relayed) the device signal 114 (e.g., location A). In some cases, however, the detection and location association may be temporal. For example, because the location indication 118 is based on the position of the mobile device 106 at the time the mobile device 106 detected the device signal 114, the location indication 118 may not include accurate location information for the lost device 104 at the time the user accesses the vendor computing service 140. In this case, for example, the mobile device 106 has transitioned from location A to location B (outside of the environment 102) by the time the user accesses the vendor computing service 140.

Figure 2:
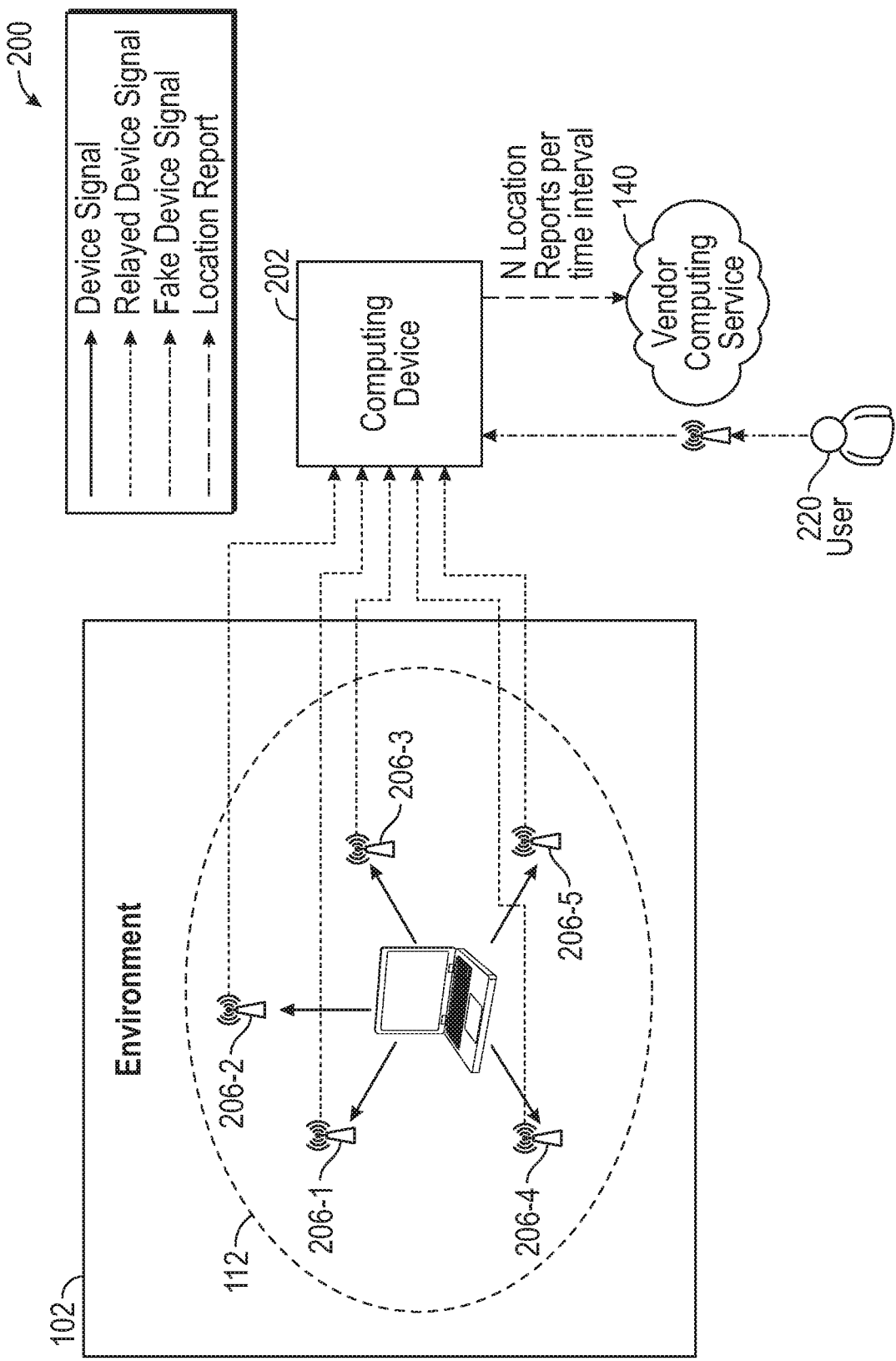
FIG. 2 illustrates an example system for determining the location of a computing device, according to one embodiment.

In some embodiments described herein, one or more access points (APs) deployed within an environment 102 can be utilized to detect and relay device signals 114. FIG. 2 depicts an example system 200 for using AP(s) 206 to determine the location of a missing device 104, according to one embodiment. As shown, APs 206 1-5 are deployed (e.g., in fixed locations) within the environment 102 and are in vicinity 112 of the lost device 104. In one embodiment, each AP 206 1-5 is configured to detect certain types of device signals. For example, assuming the device signals are BT/BLE signals, each AP 206 1-5 can incorporate BT/BLE chips that enable the AP to detect BT/BLE signals.

As shown, each AP 206 1-5 detects a device signal 114 (e.g., encrypted BLE signal) broadcast by the lost device 104, and relays the device signal 114 to the computing device 202. The computing device 202, in turn, sends location reports received from the APs 206 1-5 to the vendor computing service 140 (e.g., N location reports per time interval). The vendor computing service 140 can determine the approximate location of the lost device 104, based on the multiple location reports received from the APs 206 1-5.

One challenge with using APs 206 to relay device signals is that the relaying system may not be suitable for high density environments with a large number of APs. For example, in medium to high density environments, several APs may detect each device signal broadcast from the lost device 104, which, in turn, may result in a large number of duplicate messages sent to the vendor computing service 140. In the example shown in FIG. 2, the computing device 202 may send N (e.g., five) reports each time interval (e.g., every two seconds) to the vendor computing service 140.

Additionally, in some cases, the detection and location association may also be temporal with the use of APs 206. For example, the lost device 104 may stop broadcasting (e.g., due to an empty battery), the lost device 104 may move within the environment 102 (e.g., a user may have picked up the lost device 104), etc. In these examples, the location information based on the broadcast device signals may be inaccurate and non-informative. For instance, the location information may indicate that the lost device 104 was last seen at location (X, Y), two hours ago, but such information may not be able to indicate if the lost device 104 is currently at location (X, Y).

Further, in some cases, the relaying among the APs 206 may be susceptible to spoofing by one or more malicious actors. For example, as shown in FIG. 2, a malicious actor (e.g., user 220) can attempt to jam, replay, or send fake (or spoofed) BLE messages to an AP in order to have the AP relay that message to the vendor computing service 140.

Accordingly, embodiments described herein provide techniques for managing a messaging system (e.g., system 200) in order to identify (missing or lost) computing devices, detect impersonators, and validate detected device signals. In one particular embodiment described below, an AP is configured to detect a first type of device signal (e.g., BLE signal) and a second type of device signal (e.g., WiFi signal) from a computing device within an environment. The AP determines whether to relay location information regarding the computing device, based on an evaluation of the first type of device signal and the second type of device signal. In some cases, for example, the second type of device signal can be used to validate the first type of device signal. That is, the AP can provide a confidence factor in the detected first type of device signal, based on a comparison of one or more properties of the first type of device signal and the second type of device signal. In this manner, embodiments can validate device signals detected by APs in an environment and avoid relaying spoofed (or fake) device signals.

Note that while many of the embodiments described herein use the scenario of a missing computing device within an environment as a reference example of a scenario in which the techniques described herein can be utilized, embodiments herein can be used in other scenarios. In some embodiments, for example, the techniques presented herein can be used to aid contact tracing. In these embodiments, embodiments can determine the location of a user (via the user's computing device) that has been potentially exposed to an illness (e.g., via contact with another user or place).

Figure 3:
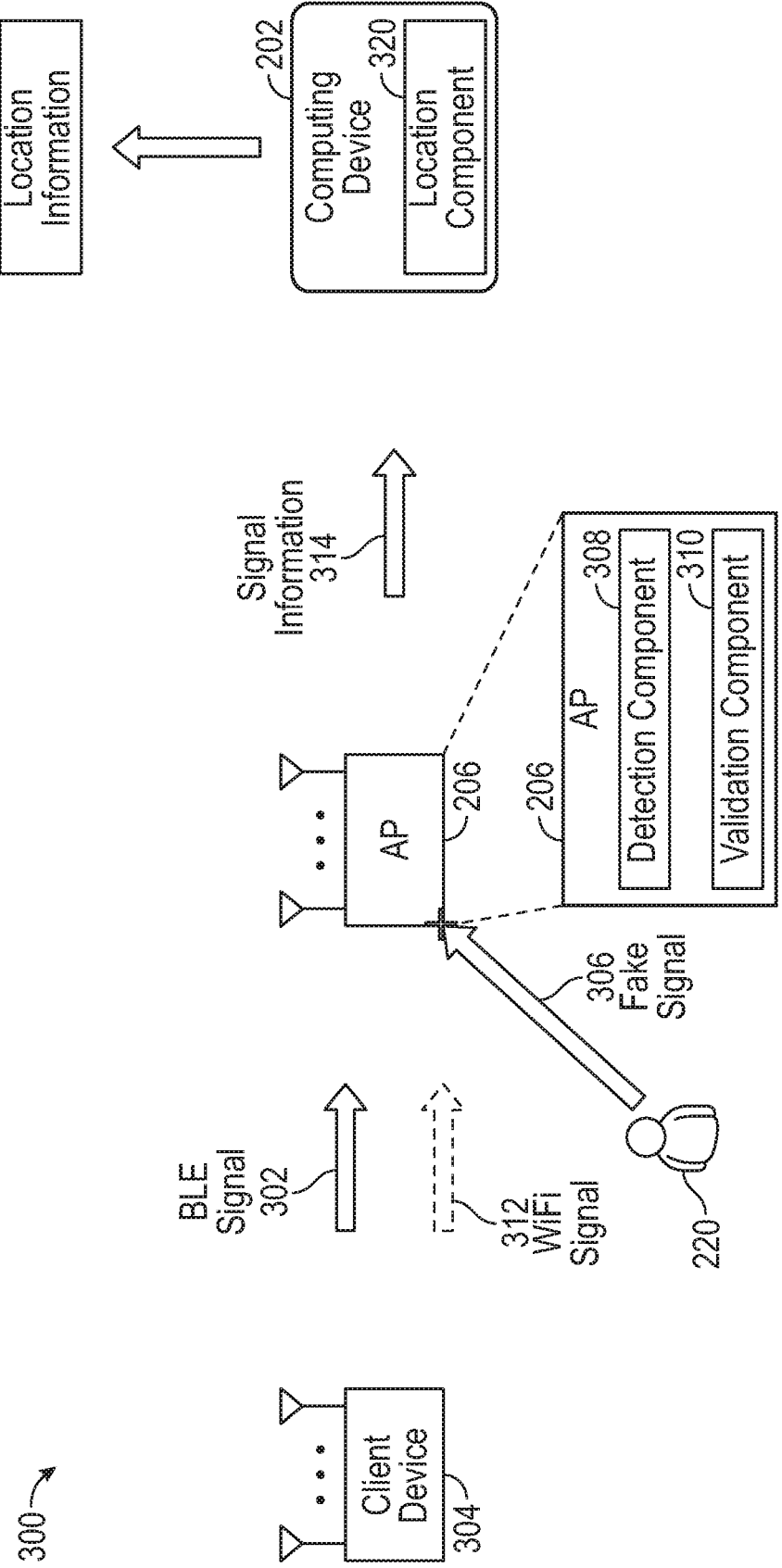
FIG. 3 illustrates an example workflow for validating device signals detected from a computing device, according to one embodiment.

FIG. 3 illustrates an example workflow 300 for validating device signals detected from a computing device, according to one embodiment. Here, the AP 206 includes a detection component 308 and a validation component 310, each of which can include software components, hardware components, or combinations thereof. The AP 206 may be within the vicinity of the client device 304. The client device 304 is representative of a variety of computing devices, including, but not limited to, a laptop, smartphone, a tablet, etc. In one embodiment, the client device 304 may be a lost or missing device (e.g., lost device 104) within an environment (e.g., environment 102). In another embodiment, the client device 304 may be associated with a user that is a target of a contact trace.

The AP 206 (via the detection component 308) detects a BLE signal 302 and/or a WiFi signal 312 transmitted from the client device 304. The detection component 308 can obtain a vendor identifier (e.g., organizational unique identifier (OUI)) associated with the client device 304 from the BLE signal 302. Assuming the vendor identifier is an OUI, for example, the vendor identifier may include the first 24 bits of the media access control (MAC) address for the client device 304. The detection component 308 can also obtain information (e.g., MAC address, signal strength/level, etc.) regarding the client device 304 from the WiFi signal 312.

The AP 206 (via the validation component 310) can determine whether the vendor identifier obtained from the BLE signal 302 is a valid vendor identifier. For example, the validation component 310 can determine whether the OUI is associated with a valid vendor/manufacturer. In addition to determining that the vendor identifier is valid, the AP 206 (via the validation component 310) can use the information obtained by the detection component 308 to validate the BLE signal 302 from the client device 304. For example, the validation component 310 can use the information to increase the confidence factor in the detection of the BLE signal 302. For instance, the validation component 310 may determine a state/context (e.g., measured signal strength/level, range, etc.) from which it detected the client device 304, based on the WiFi signal 312 (e.g., WiFi probe packet).

The AP 206 may use the obtained state/context information to increase the confidence in the validity of the BLE signal 302 detected from the client device 304. The coexistence of both the WiFi signal 312 and the BLE signal 302 at similar range, for example, may provide additional confidence that the BLE signal 302 was not spoofed (e.g., the BLE signal 302 is not a fake signal 306 from a malicious actor 220). For instance, if the validation component 310 determines that the comparison between the measured signal strength of the WiFi signal 312 and the measured signal strength of the BLE signal 302 satisfies a predetermined condition(s) (e.g., the measured signal strengths are similar, the difference between the measured signal strengths is within a threshold range, etc.), then the validation component 310 may determine that the BLE signal 302 is a valid signal as opposed to a fake signal 306.

In some embodiments, the validation component 310 may include hardware (e.g., Sage chipset) and/or software that performs recording of a signature pattern of the client device 304, based on the WiFi signal 312 and/or the BLE signal 302. The signature pattern may include a signal level, signal interval (e.g., how often the signal is sent), stochasticity of the signal around a Gaussian/normal value, RF location determination, etc. In some cases, the validation component 310 may use an extended Kalman filter to normalize the signal and limit the effect of RF changes. In situations where the BT/BLE radio and/or WiFi radio of the AP 206 is connected to multiple antennas, the validation component 310 can obtain a RF location determination by performing a signal comparison across the multiple antennas.

In some embodiments, the validation component 310 can store the signature pattern of the client device 304 and use to the signature pattern to perform validation of the BLE signal 302. For example, the validation component 310 can detect impersonations of the client device 304 based on signal(s) that have the wrong RF signature or changing RSSI levels. In another example, the validation component 310 can detect movements of the client device 304 based on deviations from the signal accepted ranges (associated with the signature pattern). In yet another example, the validation component 310 can compare the signal interval of the BLE signal 302 against a known signal interval (associated with the vendor identifier) to determine whether the BLE signal 302 is a valid signal. If the difference between the signal intervals satisfies a predetermined condition (e.g., difference is above a threshold), the validation component 310 may flag the detected signal as a fake signal 306.

As shown in FIG. 3, the AP 206 sends a message 314 with signal information to the computing device 202. The signal information, for example, may include the BLE signal 302, information regarding the BLE signal (e.g., vendor identifier, signal strength, signal interval, detected movement, detected impersonation, etc.). In one embodiment, the signal information is sent after validating the BLE signal 302. In another embodiment, the signal information is sent to indicate that the BLE signal 302 is a fake signal 306 (e.g., the signal information may indicate a detected impersonation of the BLE signal 302). In another embodiment, the signal information includes an indication of detected movement of the client device 304.

The computing device 202 includes a location component 320, which is configured to determine an approximate location (e.g., location information 322) of the client device 304, based in part on the signal information. In one embodiment, if the signal information is obtained from a single AP (e.g., a single AP is reporting), then the location information 322 includes the location of the single reporting AP and proximity to the single reporting AP. In another embodiment, if the signal information is obtained from multiple APs (e.g., multiple APs are reporting), then the location information 322 includes the location of the client device 304 (e.g., the location component 320 may use one or more triangulation techniques to determine the location of the client device 304, based on the signal information from the multiple APs). The location information 322 may also include a timestamp indicating the time when the BLE signal 302 was detected. The computing device 202 may send the location information 322 and/or the signal information (not shown) to the vendor computing service 140.

Figure 4:
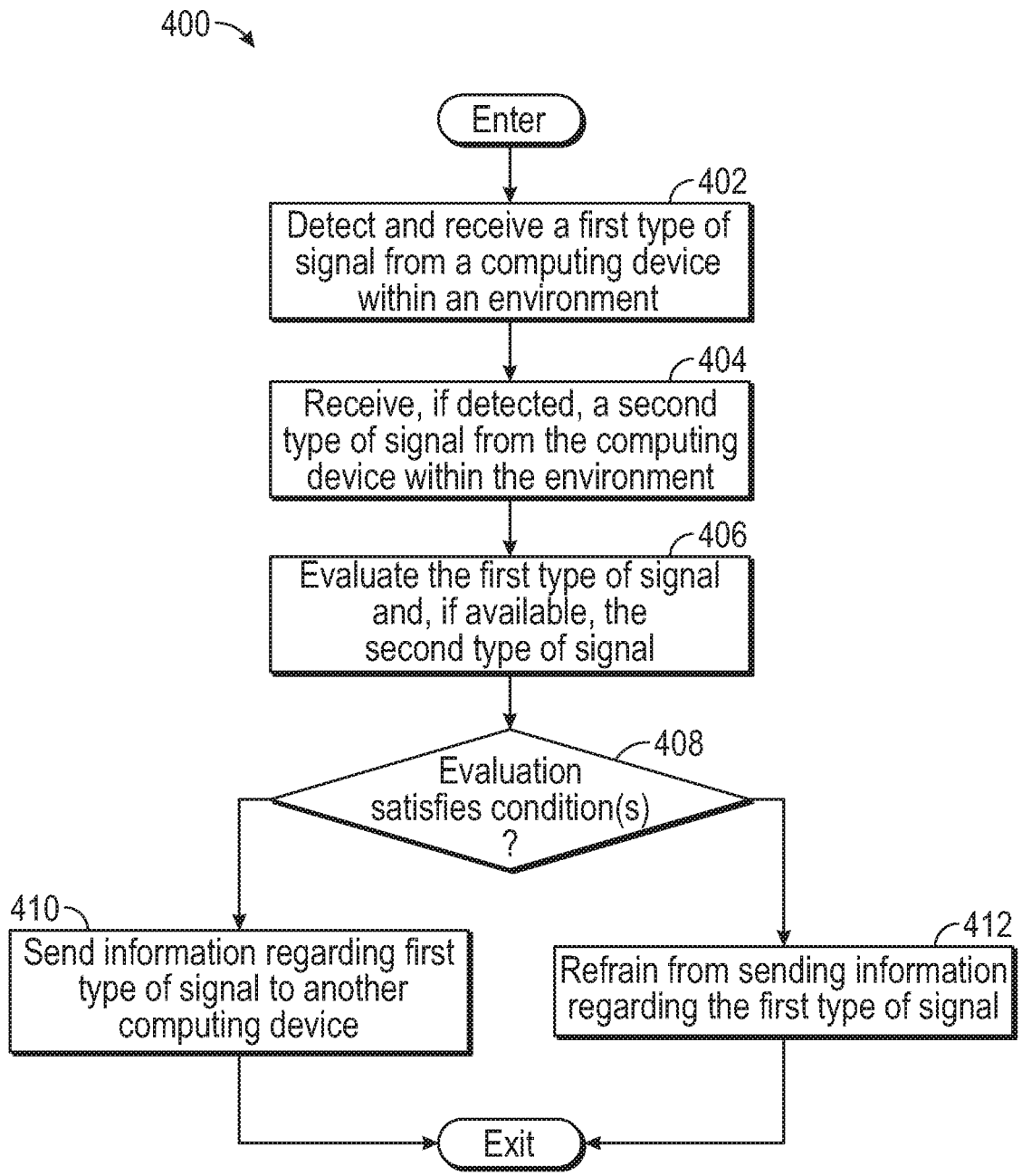
FIG. 4 is a flowchart of a method for validating device signals detected from a computing device, according to one embodiment.

FIG. 4 is a flowchart of a method 400 for validating device signals (e.g., BLE signals 302) detected from a computing device (e.g., client device 304), according to one embodiment. The method 400 may be performed by one or more components of an AP (e.g., AP 206).

The method 400 may enter at block 402, where the AP detects and receives a first type of signal (e.g., BLE signal 302) from a computing device (e.g., client device 304) within an environment (e.g., environment 102). At block 404, the AP receives, if detected, a second type of signal (e.g., WiFi signal 312) from the computing device within the environment. At block 406, the AP evaluates the first type of signal and, if available, the second type of signal. For example, the AP may obtain a vendor identifier (e.g., OUI) from the first type of signal and validate the vendor identifier. The AP may evaluate the signal strengths of the first type of signal and the second type of signal. The AP may determine a signature pattern of the computing device, based on the first type of signal and/or the second type of signal.

At block 408, the AP determines whether the evaluation satisfies one or more conditions. In one embodiment, for example, the AP determines whether the first type of signal is valid, based on a comparison of one or more signal parameters (e.g., measured signal strength) of the first type of signal and the second type of signal. For instance, if difference between the measured signal strengths of the first type of signal and the second type of signal is within a threshold difference, then AP can determine (or verify) that the first type of signal is valid. Otherwise, the AP can determine that the first type of signal is invalid. In another embodiment, the AP determines whether the first type of signal is valid, based on a signature pattern associated with the computing device. For example, if one or more parameters of the first type of signal is consistent with the signature pattern, then the AP can determine (or verify) that the first type of signal is valid.

If the AP determines that the evaluation satisfies the conditions, then the AP sends information regarding the first type of signal (e.g., message 314) to another computing device (e.g., computing device 202) (block 410). On the other hand, if the AP determines that the evaluation does not satisfy the condition(s), then the AP refrains from sending at least some information regarding the first type of signal (block 412). The method 400 may then exit.

Figure 5:
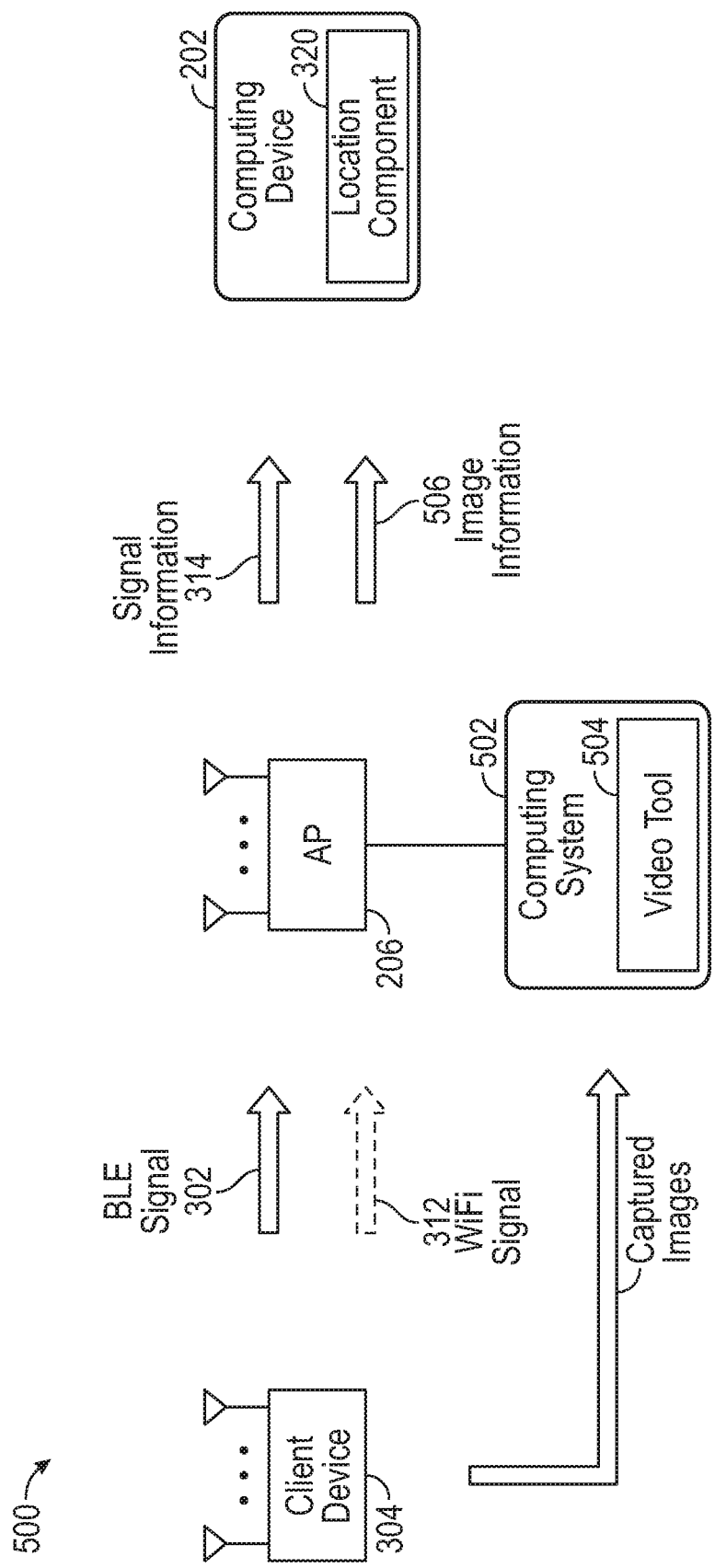
FIG. 5 illustrates an example workflow for performing object detection, according to one embodiment.

In some embodiments, the AP 206 may perform object detection based on the BLE signal(s) 302 detected from the client device 304. FIG. 5 illustrates one example workflow 500 for performing object detection, according to one embodiment. As shown, the AP 206 is coupled to a computing system 502, which includes a video tool 504. Note, the AP 206 may be coupled to the computing system 502 via a wired or wireless link. In one embodiment, the computing system 502 is an internet protocol video system (IPVS). The video tool 504 can capture images and/or record a video feed of the client device 304.

For example, upon detecting a BLE signal 302, the AP 206 can use the video tool 504 to capture a feed of the client device 304. The AP 206 can determine a shape of the client device 304, based on the vendor identifier from the BLE signal 302, and detect the client device 304 from the video feed by associating the device shape to the location of the BLE signal 302. In one embodiment, the AP 206 may store images of the client device 304, as movement of the client device 304 is detected. The AP may send the captured images (e.g. image information 506) to the computing device 202. The computing device 202 may send the image information 506 to the vendor computing service 140.

Figure 6A:
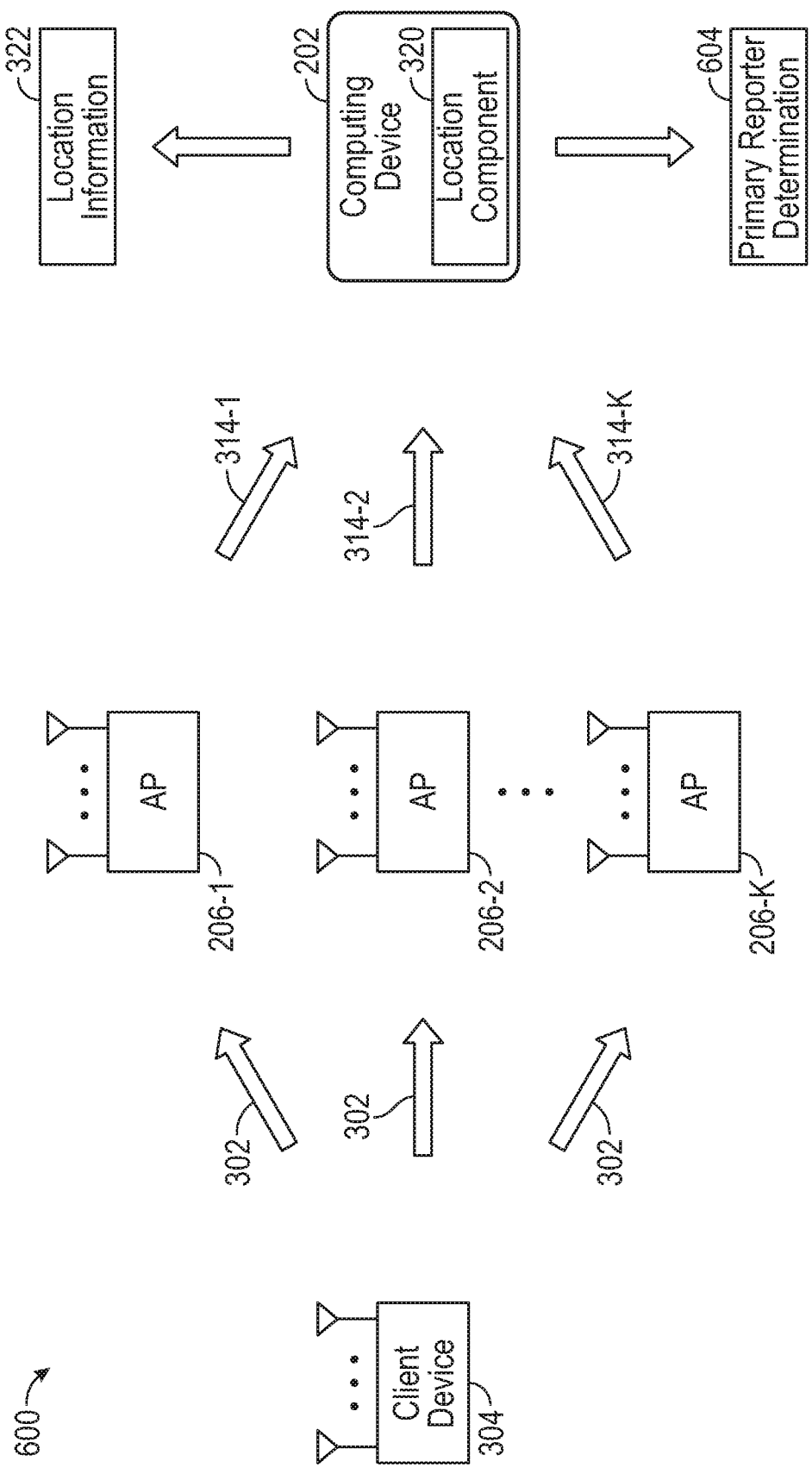
Figure 6C:
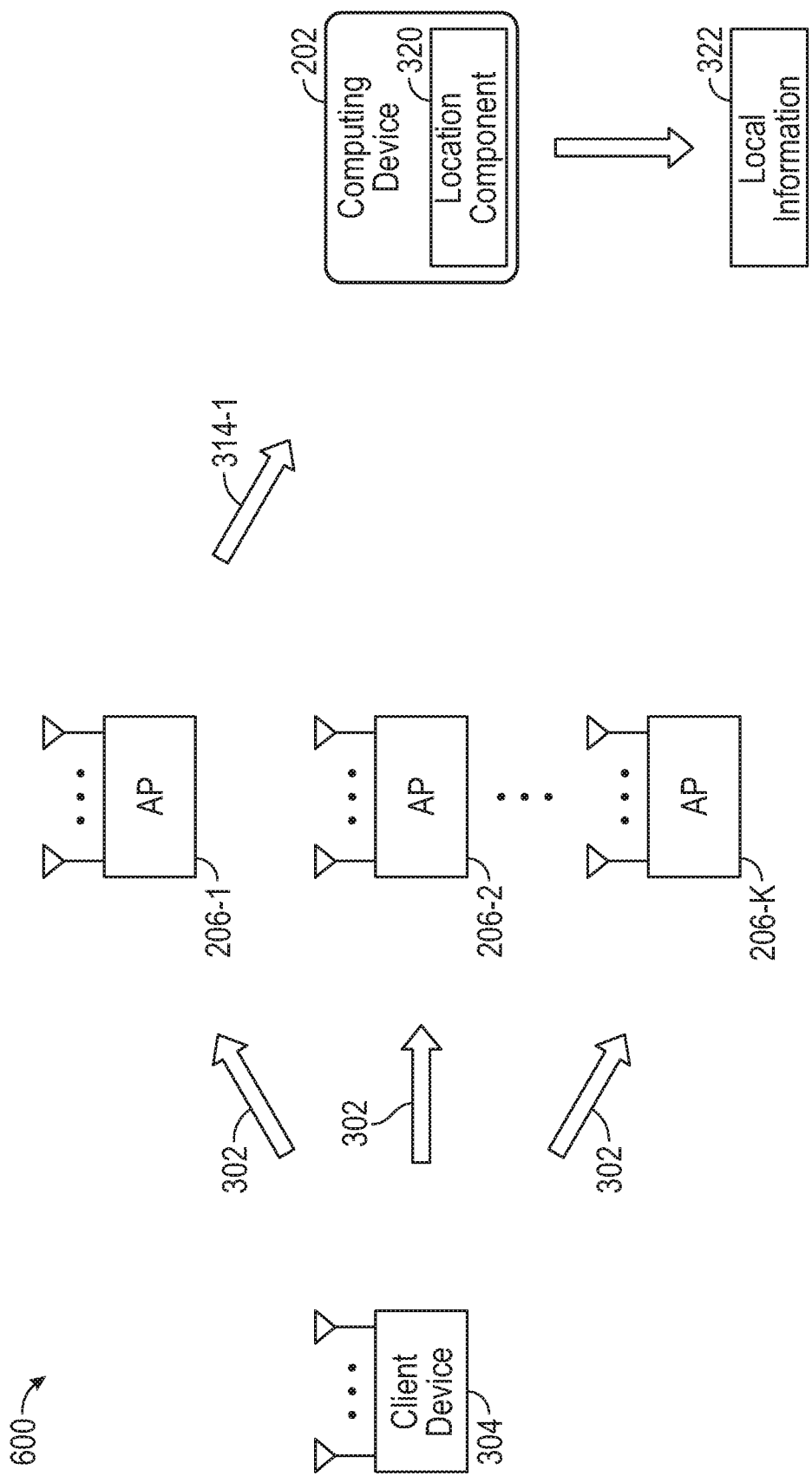

FIGS. 6A-6C illustrate a workflow 600 for managing a message relaying system, according to one embodiment. As shown in FIG. 6A, one or more APs 206 1-K (in vicinity of the client device 304) detect a BLE signal 302 broadcasted by the client device 304. The APs 206 1-K then send messages 314 1-K including signal information to the computing device 202. In one embodiment, the computing device 202 (via the location component 320) makes a primary reporter determination 604, based on the messages 314 1-K. In one embodiment, the location component 320 makes the primary reporter determination 604 after determining that one or more conditions are satisfied (e.g., the device position is stable over a predetermined time interval).

In one embodiment, the location component 320 determines which of the APs 206 1-K has received the strongest BLE signal 302 from the client device 304, and designates that AP as the primary reporter. As shown in FIG. 6B, for example, the location component 320 designates the AP 206-1 as the primary reporter, and sends a message 606 with the primary reporter indication to the AP 206-1. The location component 320 may designate the remaining reporter APs 206 2-K as secondary reporters. For example, in FIG. 6B, the location component 320 sends a hold message 608 to each of the remaining reporter APs 206 2-K. In one embodiment, the hold message triggers the APs 206 2-K to stop reporting the messages 314 2-K. As shown in FIG. 6C, for example, the primary reporter AP 206-1 continues reporting to the computing device 202 and the secondary reporter APs 206 2-K refrain from reporting to the computing device 202.

In some embodiments, the hold message 608 may cause the secondary reporter AP 206 to refrain from reporting while a certain set of conditions are satisfied. For example, the hold message 608 may cause a secondary reporter AP to stop reporting the OUI (and signal information) as long as the client device 304 is detected by the secondary reporter AP and/or is detected within configurable boundaries (e.g., no impersonation detection, no movement, RSSI is within a configurable stochasticity range, etc.). The secondary reporter APs 206 2-K may resume reporting if one of the conditions changes.

Similarly, when the primary reporter AP 206-1 detects a change (e.g., movement, impersonation, signal stops, signal interval change, etc.), the primary reporter AP 206-1 may report the change to the location component 320. The location component 320, in response, may query each of the secondary reporter APs 206 2-K for their respective status, and determine whether to change the primary reporter designation, based on the statuses.

As shown in FIG. 6C, the location component 320 sends location information 322 to the vendor computing service 140. As noted, the location information 322 can be used by a device owner to identify the client device 304. For example, a user can obtain the computed location of the client device 304, along with a timestamp of the last detection. In this manner, embodiments can significantly improve location mechanisms that rely solely on the presence of transient computing devices (e.g., passing mobile devices) to determine the location of lost devices.

Figure 7:
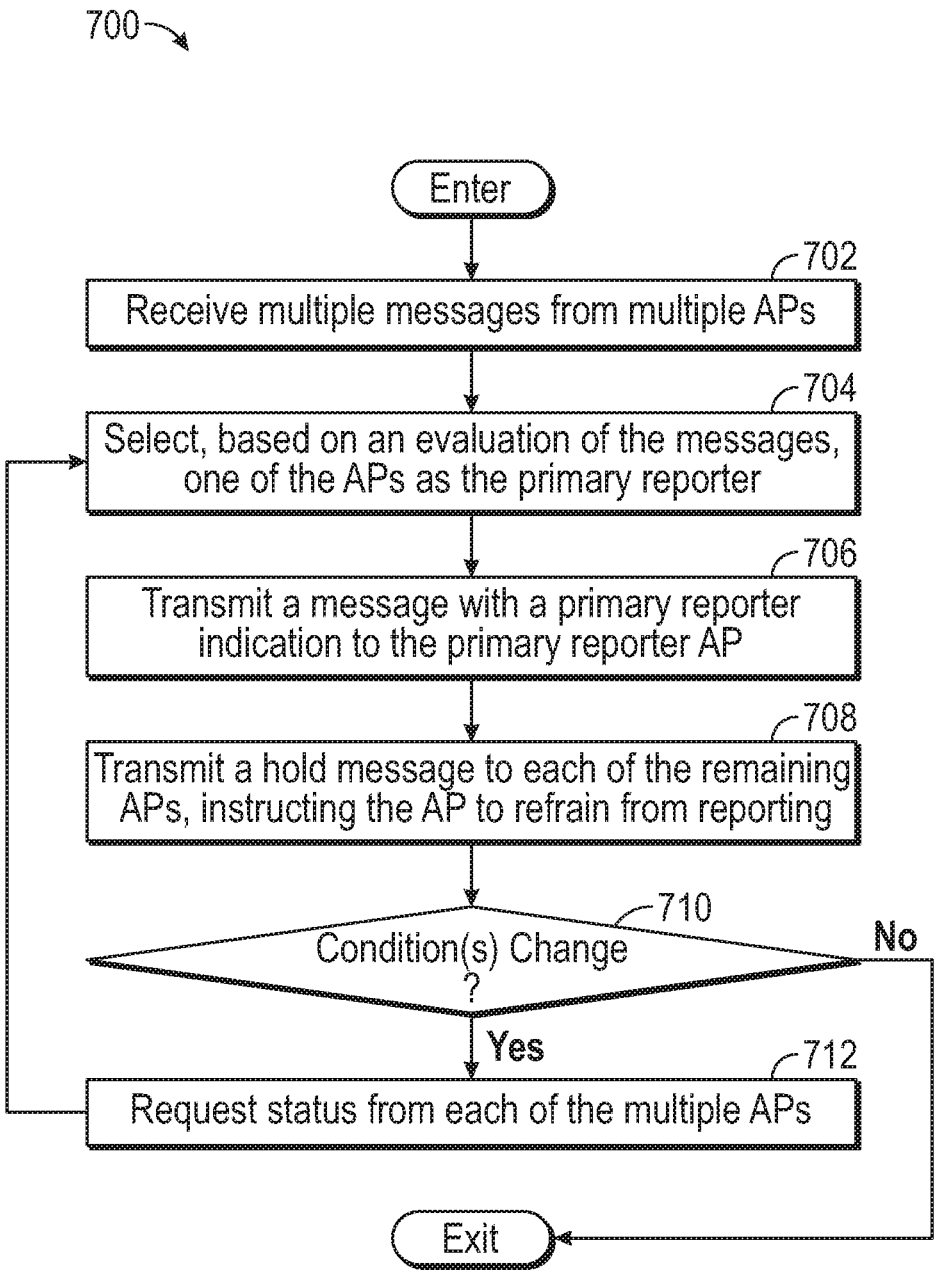
FIG. 7 is a flowchart of a method for managing a message relaying system, according to one embodiment.

FIG. 7 is a flowchart of a method 700 for managing a message relaying system, according to one embodiment. The method 700 may be performed by one or more components of a computing device (e.g., computing device 202).

The method 700 may enter at block 702, wherein the computing device receives multiple messages (e.g., messages 314) from multiple APs. Each message, for example, may include an encrypted BLE signal and/or related signal information (e.g., signal strength, RF signature pattern, etc.) obtained by an AP from a client device (e.g., client device 304).

At block 704, the computing device selects, based on an evaluation of the messages, one of the APs as the primary reporter. For example, the computing device may select the AP that has detected the BLE signal with the highest signal strength as the primary reporter. At block 706, the computing device generates and transmits a message (e.g., message 606) with an indication of the primary reporter designation to the primary reporter AP. At block 708, the computing device generates and transmits, to each remaining reporting AP, a hold message (e.g., hold message 608) instructing the AP to refrain from reporting (e.g., while certain conditions are satisfied).

At block 710, the computing device determines whether a change in one or more conditions is detected. For example, the computing device can receive an indication from the primary reporter AP and/or one or more of the secondary reporter APs indicating that there has been a change in one or more conditions. The condition change can include at least one of detected movement, detected impersonation, signal stops, signal interval change, and change in signal level, change in RF signature, etc. If the computing device determines there has been a change in condition(s), then the computing device requests the status from each of the multiple APs (block 712). The computing device can then perform another primary reporter designation (e.g., by performing blocks 704-710). If the computing device determines there has not been a change in condition(s), the method 700 exits.

Figure 8:
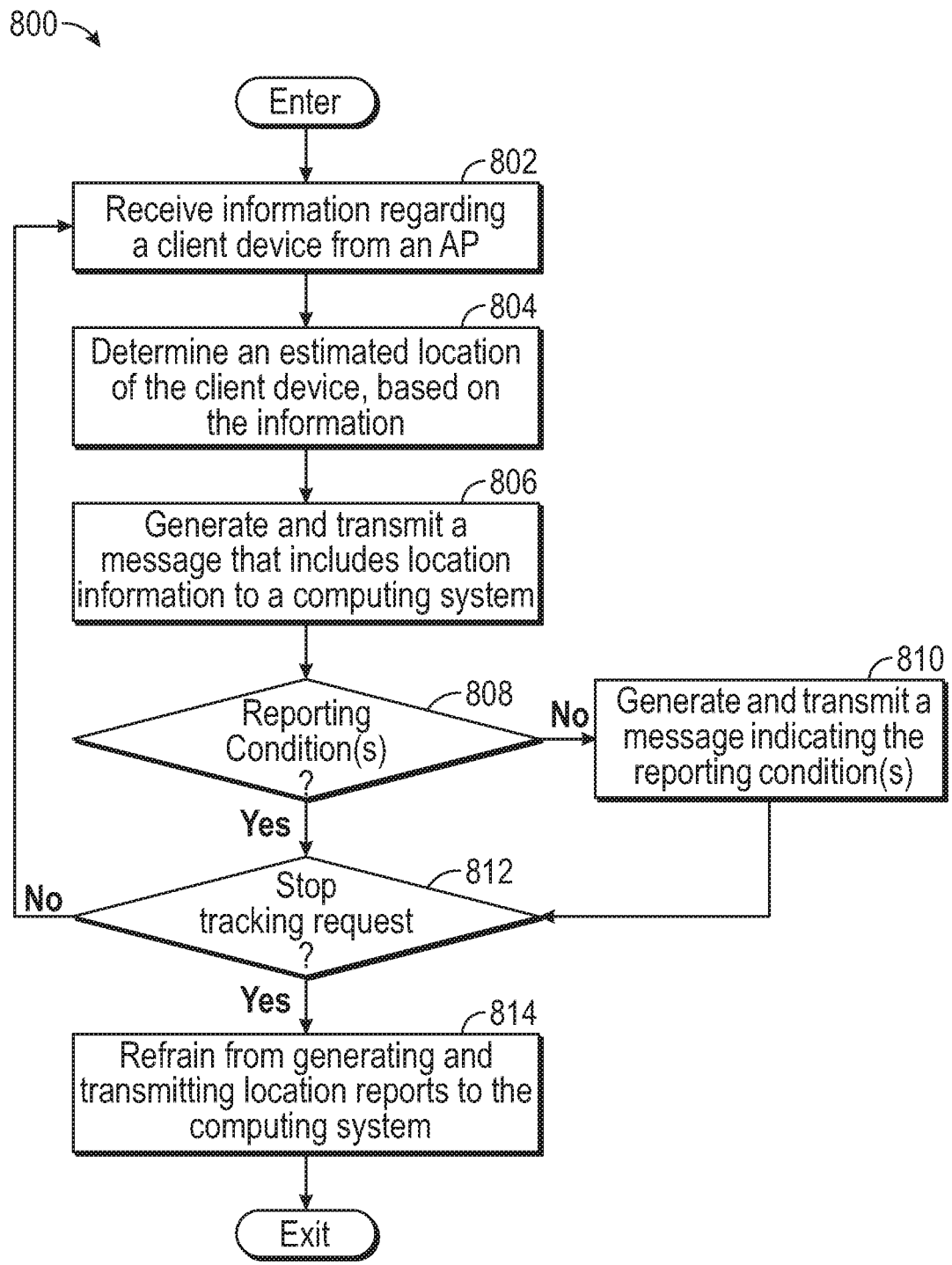
FIG. 8 is a flowchart of another method for managing a message relaying system, according to one embodiment.

FIG. 8 is a flowchart of another method 800 for managing a message relaying system, according to one embodiment. The method 800 may be performed by one or more components of a computing device (e.g., computing device 202).

The method 800 may enter at block 802, where the computing device receives information regarding a client device (e.g., client device 304) from an AP (e.g., AP 206). For example, the computing device may receive a message 314 that includes signal information (e.g., encrypted BLE signal, detected movement indication, impersonation detected, etc.) associated with the client device.

At block 804, the computing device determines an estimated location of the client device, based on the information. In the case of a single reporting AP, the computing device can determine the estimated location in terms of the proximity to the single reporting AP. In the case of multiple reporting APs, the computing device can use triangulation techniques to determine the estimated location of the client device.

At block 806, the computing device generates and transmits a message that includes location information (e.g., location information 322) to a computing system (e.g., vendor computing service 140). The location information may include an indication of the estimated location of the client device, a timestamp indicating when the client device was detected, a location of the AP (that reported to the computing device), etc. In some cases, if the client device is detected as moving, then the computing device may include the detected locations of the client device as a time series (e.g., in a location history). In some embodiments, the location information includes GPS information. In some embodiments, in addition to or in alternative to GPS information, the location information includes detailed information regarding an indoor environment (e.g., building, particular floor, particular room, etc.) where the AP is located. For example, the computing device can obtain the detailed information regarding the indoor environment from a real-time locating system (RTLS) associated with the environment.

At block 808, the computing device determines whether an indication of one or more reporting conditions has been received (e.g., from the AP(s)). The reporting condition(s) can include, for example, an indication of detected movement, an indication of impersonation or spoofing attempt, an indication that the client device stopped sending a signal, an indication of a change in signal parameters (e.g., message pattern has changed), and the like. If the computing device has received an indication of a reporting condition, then the computing device can generate a message to indicate the reporting condition(s) (block 810).

For example, if the computing device receives an indication from the reporting AP that the client device has stopped sending a device signal, then the computing device can report to the computing system (e.g., vendor computing service 140) that the computing device has not moved, but has stopped sending a device signal. This may indicate to the computing system that the client device has an empty battery.

In another example, the computing device may parse the device signal received from the AP to determine whether the device signal is being impersonated, whether the client device has been recovered, etc. For instance, although the device signal may not be decodable by the computing device (e.g., the device signal is encrypted), the computing device can expect that the same message will be sent by the client device at a given location. The computing device can therefore use this information to verify that the message pattern is not changing over time and being impersonated. Additionally, if the computing device determines that the client device has stopped sending the signal, but then detects that the same source MAC address starts sending other device signals (e.g., other BT/BLE signals), the computing device can report this to the computing system (e.g., vendor computing service 140). This situation may indicate that the client device has become active and is no longer in "rescue me" mode.

In another example, each time that an event is reported (e.g., changing RSSI, movement, impersonation, etc.), the computing device (at block 810) can send the message to an administrator. The administrator (e.g., building management, security personnel, IT administrator, etc.) may have an established trust relationship with the environment and the owner of the client device. The administrator can then access the lost device location to retrieve the client device. Once retrieved, the administrator can send a message indicating the retrieval of the client device (e.g., "Lost-and-Found have taken ownership") to the computing device. Once the retrieval message is received, the computing device may continue to report the device location to the vendor computing service 140, but may refrain from reporting events related to movement of the client device.

In another example, when device movement is detected and/or when the RF footprint changes (due to, e.g., impersonation, incoherent signal range, etc.), the computing device can generate and send a "watch" instruction to the reporting AP(s). These AP(s) can then report the device signals detected from other MAC addresses within the signal range of the client device (e.g., signaling other BT/BLE devices at the same location). In one embodiment, the computing device performs a hyperbolas correlation to confirm the location of the other detected BT/BLE devices. The computing device may perform a similar process for WiFi signals at the same location of the client device. In one embodiment, the computing device uses a Bayesian inference to sort the various signals reported at the client device location and determine the set of devices that are associated with the client device location as the client device moves (e.g., those devices with maximum likelihood of being associated with the client device).

If, at block 808, the computing device has not received an indication of a reporting condition, the computing device determines whether a stop tracking request has been received (block 812). If a stop tracking request has been received, then the computing device refrains from sending location reports to the vendor computing service 140 (block 814). The method 800 then exits. If a stop tracking request has not been received, then the method 800 proceeds to block 802.

In some embodiments, the computing device 202 can keep track of lost and/or missing devices within an environment and send the location information regarding client devices to legal intercept organizations. This information can then be used for analytics (e.g., if there is a pattern of stolen devices appearing in a certain location) to determine whether additional security is needed at the location of the lost devices.

Figure 9:
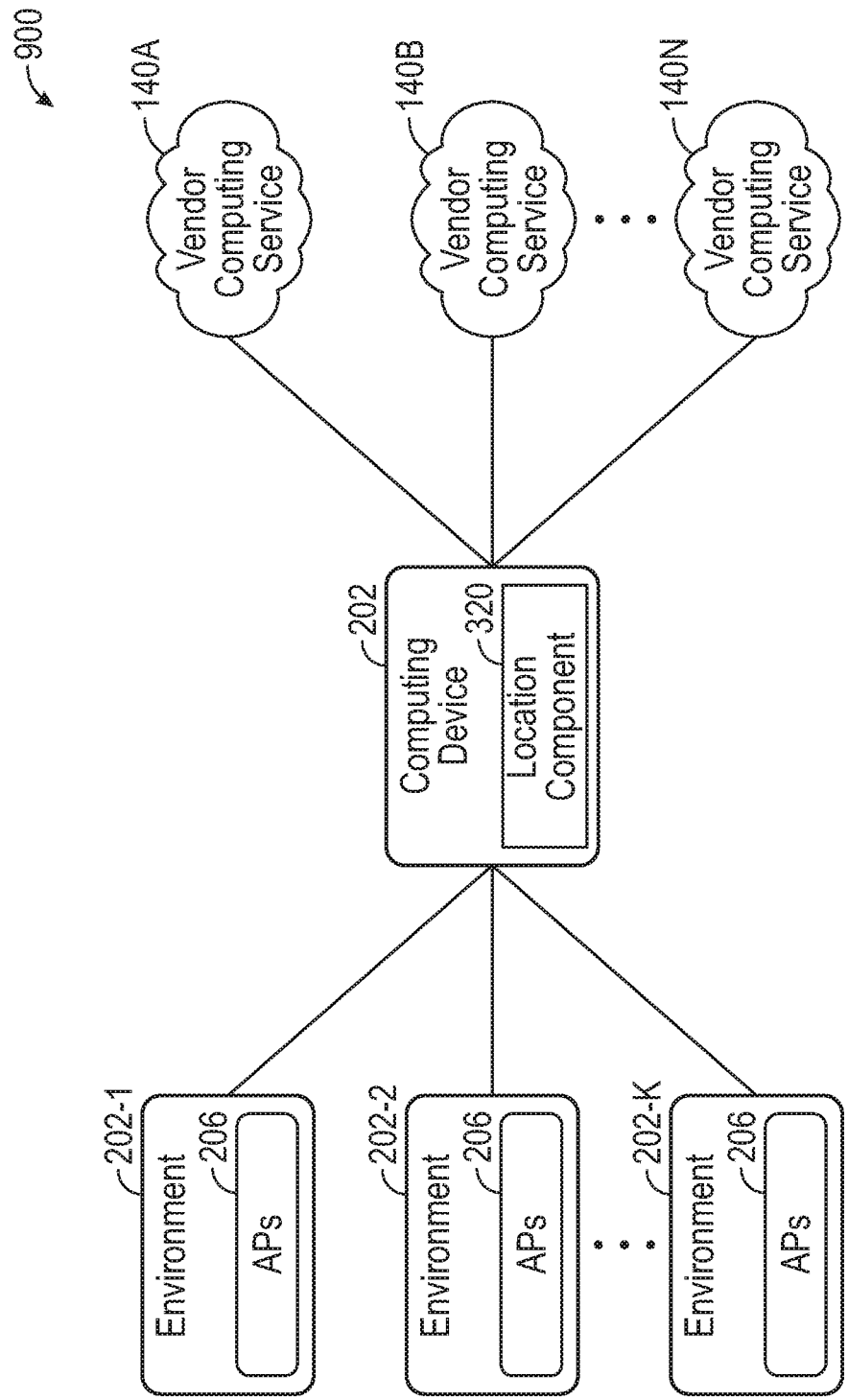
FIG. 9 illustrates an example system for interacting with multiple vendor computing services, according to one embodiment.

In some embodiments, the computing device 202 acts as an aggregation point for multiple vendor computing services. FIG. 9 illustrates an example system 900 for interacting with multiple vendor computing services, according to one embodiment. Here, the computing device 202 has a connection to multiple vendor computing services 140 A-N. The computing device 102 acts as an aggregation point to send data out to each of the vendor computing services 140 A-N. In this manner, the computing device 202 is able to replay BLE detection to one or more multiple different vendor device locating clouds.

Figure 10:
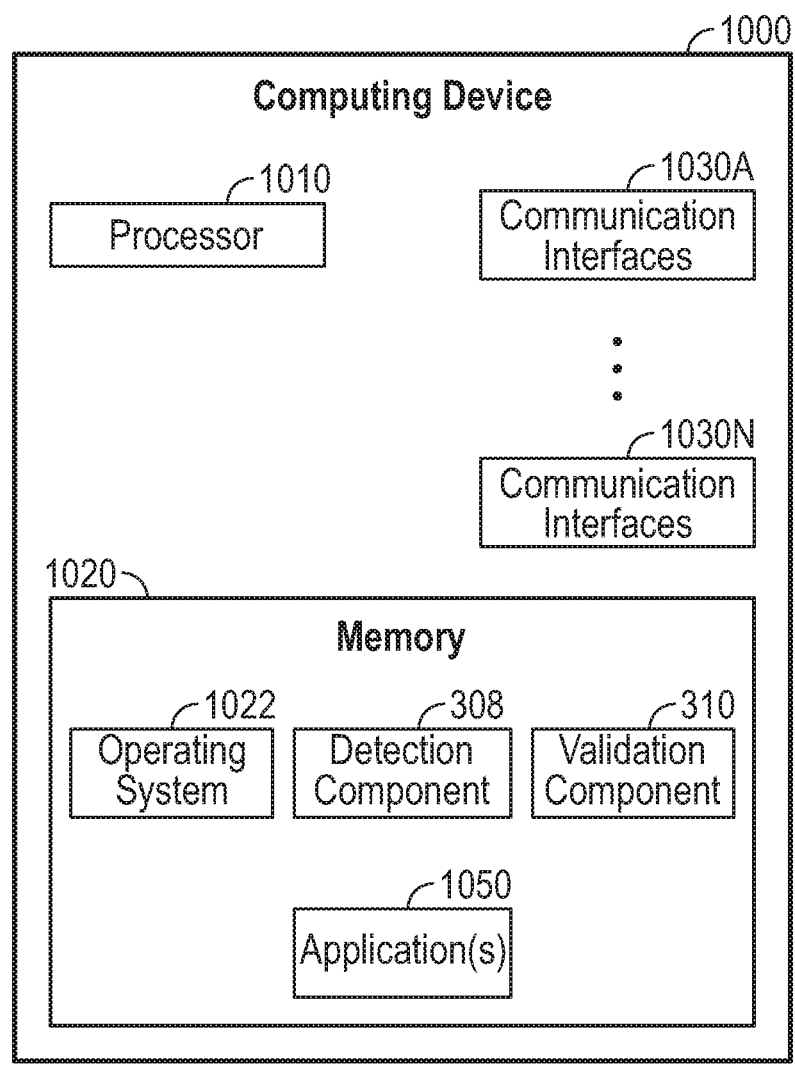
FIG. 10 illustrates an example computing device, according to one embodiment.

FIG. 10 illustrates an example computing device 1000, according to one embodiment. The computing device 1000 can be configured to perform one or more techniques described herein for validating device signals detected from a client device 304. The computing device 1000 includes a processor 1010, a memory 1020, and one or more communication interfaces 1030a-n (generally, communication interface 1030). In one embodiment, a first set of communication interfaces 1030 are used for communicating WiFi signals, and a second set of communication interfaces 1030 are used for communicating BT/BLE signals. In various embodiments, the computing device 800 is an AP. [006M] The processor 1010 may be any processing element capable of performing the functions described herein. The processor 1010 represents a single processor, multiple processors, a processor with multiple cores, and combinations thereof. The communication interfaces 1030 facilitate communications between the computing device 1000 and other devices. The communications interfaces 1030 are representative of wireless communications antennas and various wired communication ports. The memory 1020 may be either volatile or non-volatile memory and may include RAM, flash, cache, disk drives, and other computer readable memory storage devices. Although shown as a single entity, the memory 1020 may be divided into different memory storage elements such as RAM and one or more hard disk drives.

As shown, the memory 1020 includes various instructions that are executable by the processor 1010 to provide an operating system 1022 to manage various functions of the computing device 1000. As shown, the memory 1020 includes the operation system 1022, detection component 308, validation component 310, and one or more application(s) 1050.

Figure 11:
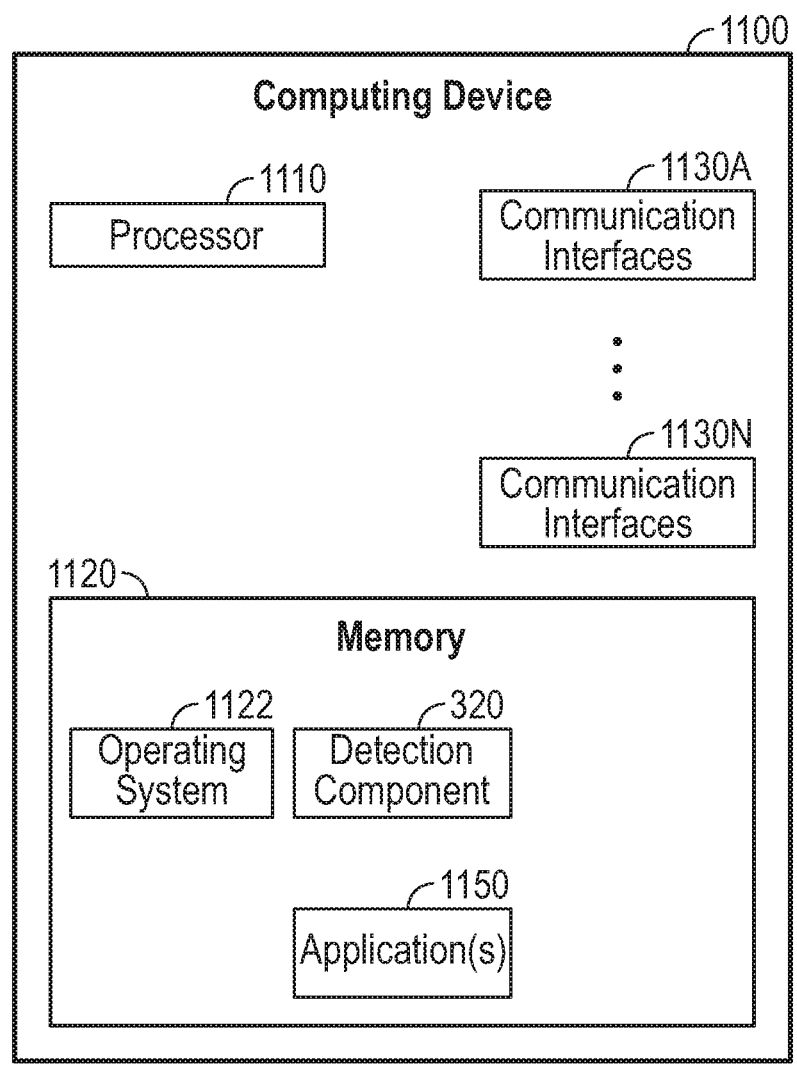
FIG. 11 illustrates an example computing device, according to one embodiment.

FIG. 11 illustrates an example computing device 1100, according to one embodiment. The computing device 1100 can be configured to perform one or more techniques described herein for managing a message relaying system. The computing device 1100 includes a processor 1110, a memory 1120, and one or more communication interfaces 1130a-n (generally, communication interface 1130). In various embodiments, the computing device 1100 is representative of a server computing device. In some embodiments, the computing device 1100 is located in a cloud computing environment.

The processor 1110 may be any processing element capable of performing the functions described herein. The processor 1110 represents a single processor, multiple processors, a processor with multiple cores, and combinations thereof. The communication interfaces 1130 facilitate communications between the computing device 1100 and other devices. The communications interfaces 1130 are representative of wireless communications antennas and various wired communication ports. The memory 1120 may be either volatile or non-volatile memory and may include RAM, flash, cache, disk drives, and other computer readable memory storage devices. Although shown as a single entity, the memory 1120 may be divided into different memory storage elements such as RAM and one or more hard disk drives.

As shown, the memory 1120 includes various instructions that are executable by the processor 1110 to provide an operating system 1122 to manage various functions of the computing device 1100. As shown, the memory 1120 includes the operation system 1122, location component 320, and one or more application(s) 1150.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method comprising:
    detecting, by an access point (AP), a first signal and a second signal from a computing device within an environment;
    performing, by the AP, a validation of the first signal, based at least in part on one or more parameters of the first signal and one or more parameters of the second signal;
    after performing the validation of the first signal, transmitting, by the AP, information regarding the first signal to a computing system; and
    after transmitting the information to the computing system, receiving, by the AP, a message from the computing system designating the AP as a primary reporter.

2. The computer-implemented method of claim 1, wherein:
    the first signal is a Bluetooth signal or a Bluetooth Low Energy (BLE) signal; and
    the second signal is a WiFi signal.

3. The computer-implemented method of claim 1, wherein the one or more parameters of the first signal comprises a signal strength of the first signal measured by the AP and the one or more parameters of the second signal comprises a signal strength of the second signal measured by the AP.

4. The computer-implemented method of claim 3, wherein performing the validation of the first signal comprises verifying that a difference between the signal strength of the first signal and the signal strength of the second signal is within a threshold range.

5. The computer-implemented method of claim 1, wherein performing the validation of the first signal comprises verifying that the first signal matches a radio frequency (RF) signature associated with the computing device.

6. The computer-implemented method of claim 1, wherein the information transmitted to the computing system comprises at least one of: the first signal, a signal strength of the first signal measured by the AP, or a radio frequency (RF) signature associated with the computing device.

7. The computer-implemented method of claim 6, further comprising obtaining, by the AP, one or more images of the computing device within the environment, after performing the validation of the first signal, wherein the information transmitted to the computing system further comprises the one or more images.

8. The computer-implemented method of claim 1, further comprising:
    detecting, by the AP, at least one of a movement of the computing device and impersonation of the computing device, based on a comparison of the one or more parameters of the first signal with a radio frequency (RF) signature associated with the computing device; and
    transmitting, by the AP to the computing system, an indication of at least one of the movement of the computing device or the impersonation of the computing device.

9. The computer-implemented method of claim 1, further comprising:
    transmitting, by the AP to the computing system, an indication that one or more conditions is satisfied, wherein the one or more conditions comprises at least one of movement of the computing device, impersonation of the computing device, or change in signal level of the first signal from the computing device; and
    after transmitting the indication, receiving, by the AP, another message designating the AP as a secondary reporter.

10. An access point (AP) comprising:
    a processor; and
    a memory containing a program that, when executed by the processor, performs an operation comprising:
        detecting a first signal and a second signal from a computing device within an environment;
        performing a validation of the first signal, based at least in part on one or more parameters of the first signal and one or more parameters of the second signal;
        after performing the validation of the first signal, transmitting information regarding the first signal to a computing system; and
        after transmitting the information to the computing system, receiving a message from the computing system designating the AP as a primary reporter.

11. The AP of claim 10, wherein:
    the first signal is a Bluetooth signal or a Bluetooth Low Energy (BLE) signal; and
    the second signal is a WiFi signal.

12. The AP of claim 10, wherein the one or more parameters of the first signal comprises a signal strength of the first signal measured by the AP and the one or more parameters of the second signal comprises a signal strength of the second signal measured by the AP.

13. The AP of claim 12, wherein performing the validation of the first signal comprises verifying that a difference between the signal strength of the first signal and the signal strength of the second signal is within a threshold range.

14. The AP of claim 10, wherein performing the validation of the first signal comprises verifying that the first signal matches a radio frequency (RF) signature associated with the computing device.

15. The AP of claim 10, wherein the information transmitted to the computing system comprises at least one of: the first signal, a signal strength of the first signal measured by the AP, or a radio frequency (RF) signature associated with the computing device.

16. The AP of claim 15, the operation further comprising obtaining one or more images of the computing device within the environment, after performing the validation of the first signal, wherein the information transmitted to the computing system further comprises the one or more images.

17. The AP of claim 10, the operation further comprising:
detecting at least one of a movement of the computing device and impersonation of the computing device, based on a comparison of the one or more parameters of the first signal with a radio frequency (RF) signature associated with the computing device; and
transmitting, to the computing system, an indication of at least one of the movement of the computing device or the impersonation of the computing device.

18. The AP of claim 10, the operation further comprising:
transmitting, to the computing system, an indication that one or more conditions is satisfied, wherein the one or more conditions comprises at least one of movement of the computing device, impersonation of the computing device, or change in signal level of the first signal from the computing device; and
after transmitting the indication, receiving, from the computing system, another message designating the AP as a secondary reporter.

19. A non-transitory computer readable medium having computer executable code stored thereon for performing an operation by an access point (AP), the operation comprising:
detecting a first signal and a second signal from a computing device within an environment;
performing a validation of the first signal, based at least in part on one or more parameters of the first signal and one or more parameters of the second signal;
after performing the validation of the first signal, transmitting information regarding the first signal to a computing system; and
after transmitting the information to the computing system:
receiving a message from the computing system designating the AP as a secondary reporter; and
in response, refraining from transmitting at least some of the information regarding the first signal to the computing system.

20. The non-transitory computer readable medium of claim 19, the operation further comprising resuming transmission of the information to the computing system upon determining that one or more conditions is satisfied, wherein the one or more conditions comprises at least one of movement of the computing device, impersonation of the computing device, or change in signal level of the first signal from the computing device.

* * * * *